United States Patent [19]
Goto et al.

[11] 3,972,022
[45] July 27, 1976

[54] INDICATOR OF VEHICLE SERVICE INTERVALS

[75] Inventors: Kenji Goto; Norio Shibata, both of Shizuoka, Japan

[73] Assignee: Toyota Jidosha Kogyo Kabushiki Kaisha, Toyota, Japan

[22] Filed: Nov. 4, 1974

[21] Appl. No.: 520,892

[30] Foreign Application Priority Data
Nov. 5, 1973  Japan.............................. 48-124262
Feb. 1, 1974  Japan.............................. 49-13446

[52] U.S. Cl............................. 340/52 D; 340/309.1;
324/94; 324/182
[51] Int. Cl.²...................................... G01C 22/02
[58] Field of Search ................. 340/52 D, 52 F, 53, 340/309.1; 324/94, 181, 182; 235/61–66, 95 R, 97, 92 NT

[56] References Cited
UNITED STATES PATENTS
3,355,731  11/1967  Jones, Jr. ........................ 324/182 X
3,432,814  3/1969  Bissett.............................. 324/94 X
3,603,880  9/1971  Brecker, Jr. ......................... 324/182

*Primary Examiner*—Alvin H. Waring
*Attorney, Agent, or Firm*—Spensley, Horn & Lubitz

[57]  ABSTRACT

An indicator of vehicle service intervals for use in a vehicle comprising a transducer for transducing the revolution of the transmission output shaft of the vehicle into an electrical signal, an electrolytic integrating element electrolytically corroded by the output signal of the transducer, and a display unit for giving visible and audible alarms in response to the circuit cut-off action of the time limit element. In the system, successive pulses representing the distance traveled by the vehicle are integrated to cause progressive electrolytic corrosion of the electrolytic integrating element, and the alarm is displayed when the total traveled distance attains a predetermined value.

16 Claims, 11 Drawing Figures

INDICATOR OF VEHICLE SERVICE INTERVALS

BACKGROUND OF THE INVENTION

This invention relates to an indicator of vehicle service intervals for detecting and displaying the arrival of the time limit at which inspection and reconditioning of a vehicle must be carried out. More particularly, this invention relates to an indicator of the kind above described in which the distance traveled by a vehicle is integrated so as to generate a display signal or to actuate a suitable control means when the total distance traveled by the vehicle attains a predetermined value representing the time limit at which inspection and reconditioning of the vehicle must be carried out.

It is generally necessary to inspect and recondition various parts of a vehicle at a suitable time in order to ensure safe and trouble-free running of the vehicle. This inspection and reconditioning work is desirable for previously detecting such parts which are going to develop trouble or failure before such trouble or failure occurs, and to this end, it is important to inspect and recondition the necessary parts of the vehicle at a predetermined proper time. Commonly, this time is determined on the basis of the distance having been traveled by the vehicle.

According to prior art practice, the distance traveled by a vehicle is displayed only by an odometer and the driver reads the indication of the odometer to determine the time at which the vehicle must be inspected and reconditioned. Thus, the necessary inspection and reconditioning has not necessarily been carried out at the proper time, and a situation has frequently occurred in which the necessary inspection and reconditioning is carried out at a time considerably later than the proper time especially for such a reason that the driver forgets to read the indication of the odometer. Failure to carry out the necessary inspection and reconditioning at the proper time means that the vehicle continues to run in a dangerous state, and this tends to increase the rate of occurrence of accidents. Thus, such failure has tended to provide a very great social problem. In recent years, vehicles are obligated to equip an exhaust gas recirculating device, a catalytic converter or the like for preventing pollution of the atmosphere. These exhaust gas purifiers must be inspected or the catalyzer must be replaced by a fresh one after the vehicles have run a suitable distance.

SUMMARY OF THE INVENTION

In accordance with the present invention, there is provided an indicator of vehicle service intervals for detecting and displaying the arrival of the time limit at which inspection and reconditioning of a vehicle must be carried out, comprising transducing means for transducing the rotating speed of the transmission output shaft of the vehicle into an electrical signal, traveled distance integrating means including an electrolytic integrating element for integrating the electrical output signal of said transducing means by an electrochemical integrating operation and generating an alarm signal when the integrated amount of said applied input attains a predetermined value, and display means for performing an alarm displaying operation in response to the application of the alarm signal from said electrolytic integrating element.

According to the system of the present invention, the electrolytic integrating element having the electrochemical integrating function operates when the total distance traveled by a vehicle attains a predetermined value so as to reliably inform the driver of the arrival of the time limit at which inspection and reconditioning of the vehicle must be carried out. Thus, the driver can be pressed to make overall inspection and reconditioning of necessary parts of the vehicle so that the vehicle can drive always in the best conditions.

It is an object of the present invention to provide an indicator for detecting and displaying the arrival of the time limit at which inspection and reconditioning of a vehicle must be carried out, which system can reliably alarm and display the fact that the total distance traveled by the vehicle attains a predetermined value.

Another object of the present invention is to provide an indicator of the kind above described which can reliably alarm and display the arrival of the time limit at which an exhaust gas purifier in the vehicle must be inspected and reconditioned or a catalyzer in such a purifier must be replaced.

Still another object of the present invention is to provide an indicator of the kind above described which includes an electrolytic integrating element that can be repeatedly utilized for the purpose without any replacing requirement and which can therefore operate with a low maintenance cost.

DETAILED DESCRIPTION OF THE INVENTION

Figure 1:
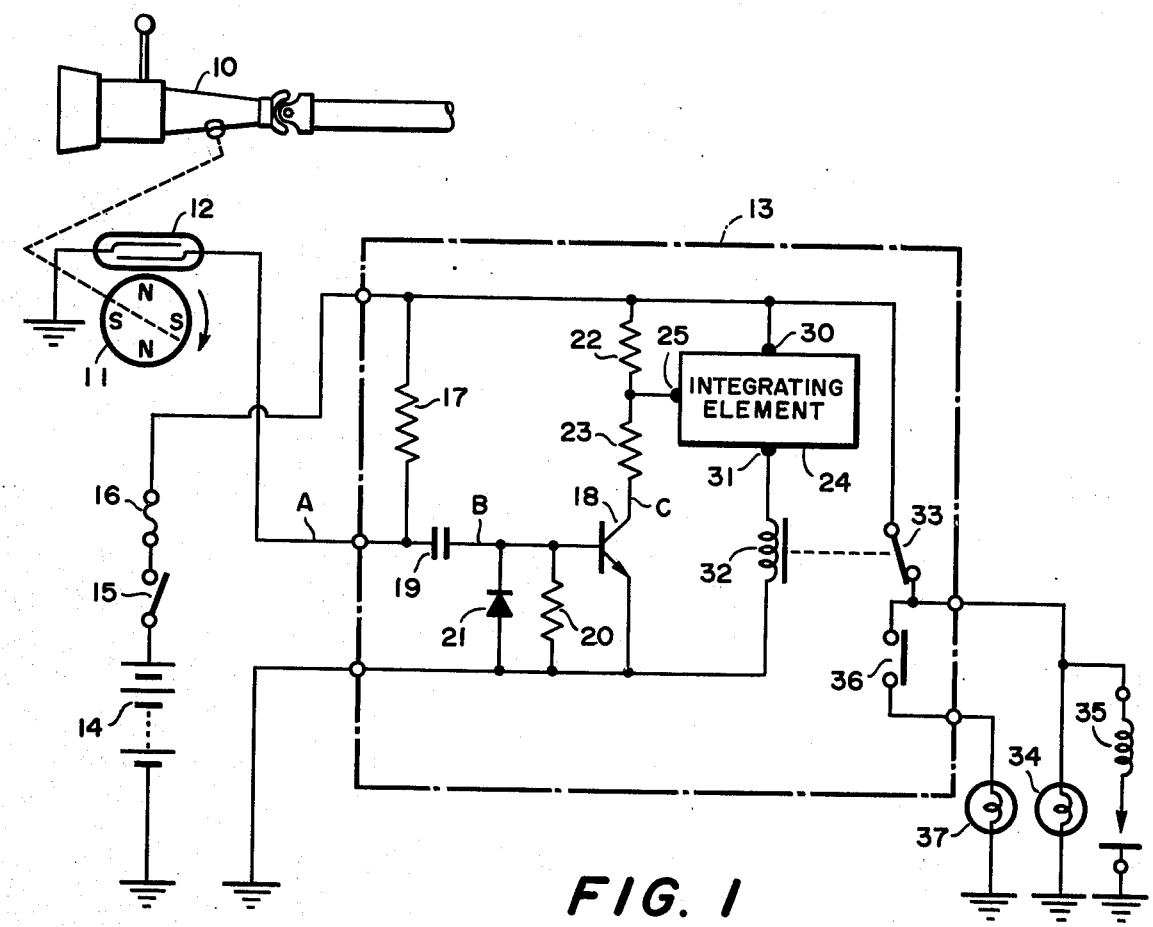
FIG. 1 is a circuit diagram showing a first embodiment of the present invention.

The present invention will now be described in detail with reference to some preferred embodiments thereof illustrated in the drawing.

Figure 2:
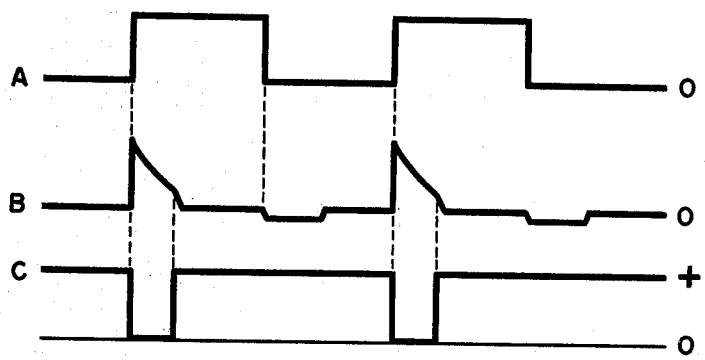
FIG. 2 shows signal waveforms appearing at various parts of FIG. 1.

FIG. 1 shows a first embodiment of the indicator according to the present invention for detecting and displaying the arrival of the time limit at which inspection and reconditioning of a vehicle must be carried out. Referring to FIG. 1, a magnet 11 for driving a speedometer is directly connected to an output shaft 10 of a transmission of a vehicle in a manner commonly known in the art. This magnet 11 is in the form of a disc and is magnetized to provide at least one pair of magnetic poles at the outer peripheral portion thereof. A reed switch 12 is disposed in close proximity to the magnet 11 to constitute a transducer for transducing the revolution of the transmission output shaft 10 into an electrical signal. With the rotation of the magnet 11, the reed switch 12 is repeatedly turned on and off, and the output of this reed switch 12 is applied to a traveled distance integrator 13. A battery 14 supplies a power supply voltage to the traveled distance integrator 13 through an ignition key switch 15 and a fuse 16. The output signal A of the reed switch 12 is applied to the base of a transistor 18 through an input resistor 17 and a differentiator described later. The output signal A of the reed switch 12 has a frequency proportional to the rotating speed of the output shaft 10 of the transmission as shown in FIG. 2A. This output signal A is differentiated by a differentiator which is composed of a capacitor 19 and a resistor 20. A diode 21 is connected in parallel with this resistor 20. Therefore, the rising portion only of the signal waveform A is differentiated, while the falling portion of the signal waveform A is shorted by the diode 21, with the result that the output of the differentiator has a waveform as shown in FIG. 2B and such waveform is applied to the base of the transistor 18. Thus, the collector voltage C appearing at the collector of the transistor 18 subjected to on-off control by the output B of the differentiator has a pulse waveform as shown in FIG. 2C. The pulse width of this waveform C has a constant value determined by the characteristic of the differentiator and by the operating characteristic of the transistor 18, and the frequency thereof varies depending on the rotating speed of the output shaft 10 of the transmission. A pair of series-connected resistors 22 and 23 are connected to the collector of the transistor 18, and the collector voltage C is applied to an electrolytic integrating element 24 through these resistors 22 and 23. The resistor 22 is provided for compensating dark current and the resistor 23 is provided for supplying current to the electrolytic integrating element 24.

Figure 3:
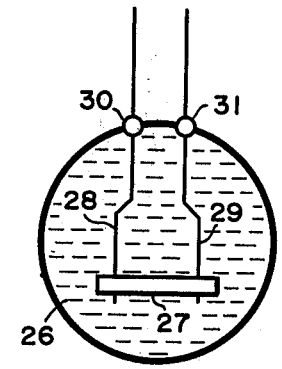
FIG. 3 is a schematic sectional view of an electrolytic integrating element preferably employed in the present invention.

The electrolytic integrating element 24 has a structure as shown in detail in FIG. 3, and the principle of electrochemical electrolytic corrosion is utilized therein. As will be apparent from FIG. 3, the electrolytic integrating element 24 has such a basic structure that an electrolyte such as a copper sulfate solution 26 is enclosed within a hollow spherical cathode 25 of, for example, nickel, and an anode 27 of, for example, copper is immersed in the copper sulfate solution 26. The anode 27 is supported at opposite ends thereof by leads 28 and 29, and the respective leads 28 and 29 extend to the exterior of the cathode 25 by being supported at the penetrating portions thereof by electrical insulating members 30 and 31 fixed in these portions of the cathode 25. The cathode 25 of the electrolytic integrating element 24 shown in FIG. 3 is connected to the connection point between the resistors 22 and 23 connected to the transistor 18, and the lead 28 is connected to the positive side of the battery 14, while the lead 29 is connected to chassis ground through an energizing coil 32 of an output relay as seen in FIG. 1.

No electrochemical reaction takes place in the electrolytic integrating element 24 of the above structure when the transistor 18 is in the cut-off state, due to the fact that both the anode 27 and the cathode 25 in the element 24 are maintained at the potential of the positive terminal of the battery 14 and no potential difference is produced across the anode 27 and the cathode 25. However, when the transistor 18 is turned on, collector current of the transistor 18 produces a forward potential difference across the anode 27 and the cathode 25 of the electrolytic integrating element 24, and as a result, the copper sulfate solution 26 is subjected to electrolysis and the metallic copper forming the anode 27 is dissolved in the solution 26. Therefore, the copper anode 27 is progressively subjected to the electrochemical electrolytic corrosion as the transistor 18 is repeatedly turned on, and the size of the anode 27 is gradually reduced. Due to the gradual dissolution of the metallic copper, the concentration of the copper sulfate solution 26 may be gradually increased and the reaction may be gradually slowed down. However, by virtue of the fact that nickel is used as the cathode 25 of the electrolytic integrating element 24 in this embodiment, the copper dissolved once in the solution 26 deposits on the surface of the cathode 25 again. Accordingly, the concentration of the copper sulfate solution 26 is maintained substantially constant and the reaction velocity is also substantially constant.

A contact 33 of the output relay is connected at one end thereof to the positive side of the battery 14 to be subjected to on-off control by the energizing coil 32 of the output relay and at the other end thereof to a display lamp 34 and to a buzzer unit 35. The latter end of the output relay contact 33 is further connected to another display lamp 37 via another contact 36.

In the circuit state shown in FIG. 1, the ignition key switch 15 is in the open position to cut off the battery 14 from the circuit, and the output relay contact 33 is held in the closed position. When the key switch 15 is closed in such a circuit state, current is supplied from the battery 14 to the output relay energizing coil 32 via the anode 27 of the electrolytic integrating element 24. Consequently, the output relay contact 33 is urged to the open position at such a high speed that the display lamp 34 and buzzer unit 35 are not energized. Thus, the output relay energizing coil 32 and the output relay contact 33 constitute a circuit which prevents or restrains premature display operation. The transistor 18 is repeatedly turned on for a constant period of time at a frequency proportional to the rotating speed of the output shaft 10 of the transmission as described previously, and during this period of time, the anode 27 of the electrolytic integrating element 24 is progressively electrolytically corroded. The rate of dissolution of the anode 27 of the electrolytic integrating element 24 due to the electrolytic corrosion is determined by the voltage applied across the anode 27 and the cathode 25 of the electrolytic integrating element 24 and by the duration of voltage application. Utilizing the above fact, the input pulses are successively integrated so that the electrolytic integrating element 24 can operate in response to the integration of a predetermined number of such pulses.

Figure 4:
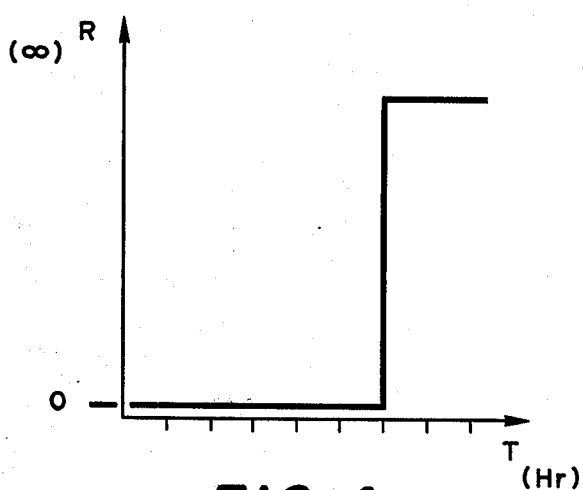
FIG. 4 shows the operating characteristic of the electrolytic integrating element shown in FIG. 3.

FIG. 4 shows the operating characteristic of the electrolytic integrating element 24. It will be seen from FIG. 4 that the anode 27 is gradually reduced in size by the electrolytic corrosion and is finally completely destroyed after application of a predetermined number of pulses to provide an infinitely large resistance value R. In a strict sense, the resistance value R is gradually increased, but such a variation in the resistance value R is not shown in FIG. 4 for simplicity.

It will be apparent from the foregoing description that, by determining the characteristic of the electrolytic integrating element 24 in such a manner that its operation takes place when the total distance traveled by the vehicle attains a predetermined setting, the electrolytic integrating element 24 can be used as a switching means which cuts off the output relay energizing circuit when the predetermined total distance has been run by the vehicle. In response to the cut-off of the output relay energizing circuit by the electrolytic integrating element 24, the output relay contact 33 is restored to the closed position from the open position in which it has been held by the output relay energizing coil 32. As a result, the battery 14 is connected to the display lamp 34 and to the buzzer unit 35, and the display lamp 34 is energized to provide a visible alarm, while the buzzer unit 35 generates an audible alarm. Therefore, when these visible and audible alarms are issued, the driver of the vehicle can recognize without fail the fact that the vehicle has already traveled the predetermined total distance and inspection and reconditioning of the vehicle must be carried out.

The characteristic of the electrolytic integrating element 24 can be freely set by suitably selecting the shape and size thereof, the kind and concentration of the electrolyte, and the materials of the anode and cathode. Any suitable electrolytic integrating element may be selected depending on the services including indication of the periodical inspection time of vehicles or indication of the periodical replacement time of exhaust gas purifiers. Further, a plurality of electrolytic integrating elements selected to serve various purposes may be provided to deal with various parts which must be inspected and reconditioned at different times.

Figure 5:
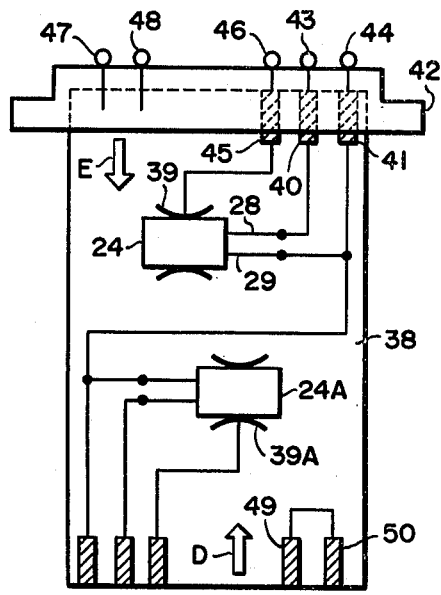
FIG. 5 is a front elevational view of a supporting base for the electrolytic integrating element.

FIG. 5 shows a manner of mounting the electrolytic integrating element 24 on a supporting base 38 so that the electrolytic integrating element 24 can be very easily placed in the circuit. In the form shown in FIG. 5, a pair of independent electrolytic integrating elements 24 and 24A are provided and each of them is the same as that shown in FIG. 3. These electrolytic integrating elements 24 and 24A are inserted in respective holders 39 and 39A secured to the supporting base 38 as shown in FIG. 5.

Leads 28 and 29 extending from the electrolytic integrating element 24 are respectively connected via jacks 40 and 41 to a power supply terminal 43 and an earth terminal 44 in a connector 42 disposed in the vehicle compartment not shown in detail. The cathode 25 of the electrolytic integrating element 24 is connected to the collector of the transistor 18 via the holder 39 and a jack 45. Terminals 47 and 48 corresponding to the contact 36 shown in FIG. 1 are provided in the connector 42, and these terminals 47 and 48 are maintained in an open state when the supporting base 38 is mounted in a direction as shown by the arrow D in FIG. 5. Therefore, the display lamp 37 would not be energized even when the output relay contact 33 is urged to the closed position in response to the operation of the electrolytic integrating element 24 in FIG. 1. The structure including the electrolytic integrating elements 24 and 24A and the supporting base 38 shown in FIG. 5 is advantageous in that the used electrolytic integrating element 24 can be easily replaced by a new one. More precisely, when the supporting base 38 is mounted in an opposite direction or in a direction as shown by the arrow E in FIG. 5, the unused electrolytic integrating element 24A is now connected to the terminals 43, 44 and 46 in lieu of the electrolytic integrating element 24 to participate in the time limit indicating operation. Further, in this case, jacks 49 and 50 establish an electrical path between the terminals 47 and 48. Thus, the display lamp 37 shown in FIG. 1 is energized in response to the cut-off of the circuit by the electrolytic integrating element 24A to indicate that a spare electrolytic integrating element is not present.

Figure 6:
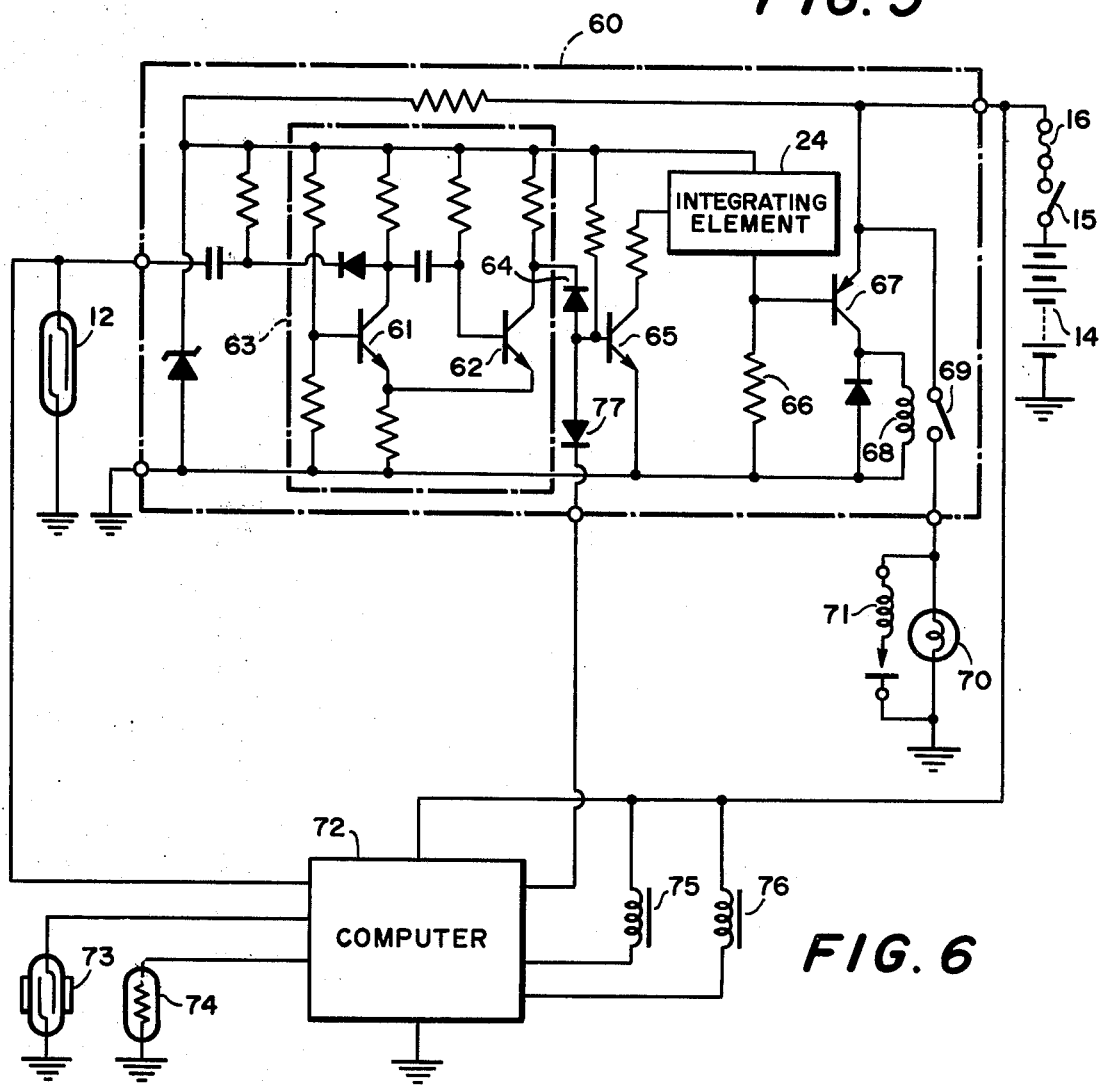
FIG. 6 is a circuit diagram showing a second embodiment of the present invention.

FIG. 6 shows a second embodiment of the present invention which is a system for detecting the time limit at which a catalyzer in an exhaust gas purifier must be replaced. The system shown in FIG. 6 includes a traveled distance integrator 60 which is generally similar to that shown in FIG. 1 but differs from the latter in the point described below. The integrator 60 in the embodiment shown in FIG. 6 employs a monostable multivibrator, whereas the integrator 13 in the embodiment shown in FIG. 1 employs an RC differentiator for the waveform shaping of input pulses.

Referring to FIG. 6, input pulses from a reed switch 12 are applied to a monostable multivibrator 63 including known oscillation transistors 61 and 62 to be converted into a pluse signal having a predetermined pulse width. The output of the monostable multivibrator 63 is applied via a diode 64 to the base of an output transistor 65 for the on-off control of the output transistor 65 in timed relation with the on-off of the reed switch 12, that is, depending on the rotating speed of the transmission output shaft of a vehicle. The collector of the output transistor 65 is connected to a cathode of an electrolytic integrating element 24 as in the first embodiment so as to integrate the traveled distance of the vehicle in the electrolytic integrating element 24 in the manner described previously. This electrolytic integrating element 24 is the same as that described with reference to FIG. 3 and cooperates with a resistor 66 to supply a bias voltage to the base of a driving transistor 67 to maintain this transistor 67 in the cut-off state until the total traveled distance attains a predetermined setting. The anode in the electrolytic integrating element 24 is destroyed when the predetermined distance setting is reached. As a result, the earth potential appears at the base of the driving transistor 67 to turn on this transistor 67, and an output relay coil 68 connected to the collector of the transistor 67 is energized to urge an output relay contact 69 to the closed position. A display lamp 70 and a buzzer unit 71 are connected to this relay contact 69 so as to detect and display the fact that the distance traveled by the vehicle has attained the predetermined setting.

In the embodiment shown in FIG. 6, an exhaust gas control computer 72 is provided for controlling the exhaust gas purifier. A switch 73 for detecting the engine cooling water temperature and a thermistor 74 for detecting the internal temperature of the catalytic converter apply their signals to the exhaust gas control computer 72, and output signals of the exhaust gas control computer 72 are applied to respective electromagnetic valves 75 and 76 to control the exhaust gas purifier for the efficient processing of exhaust gases. As is commonly known, the exhaust gas purifier is generally so constructed that it does not operate when the vehicle speed is higher than a certain value or when the catalytic converter is overhheated. Thus, the signal from reed switch 12, which counts the number of revolutions of the output shaft of the transmission, is applied to the exhaust gas control computer 72 as shown in FIG. 6 for the on-off control of the operation of the exhaust gas purifier depending on the speed of the vehicle. Therefore, in the arrangement of the second embodiment shown in FIG. 6, the total reaction period of the catalyzer charged in the exhaust gas purifier will not exactly coincide with the total traveled distance of the vehicle and will be somewhat less than what it should actually be. With a view to obviate such a problem and in order to detect the exact time at which the catalyzer must be replaced, the control computer 72 applies an instruction signal to the base of the output transistor 65 via a diode 77 which acts as a gate. The control operation is such that the control computer 72 applies negative pulses to the base of the output transistor 65 to maintain this transistor 65 in the cut-off state when the exhaust gas purifier ceases to operate due to an increase of the vehicle speed over the predetermined value or for any other reasons. Thus, the input signal applied through the diode 64 is not transmitted to the electrolytic integrating element 24 by being intercepted by the transistor 65, and the traveled distance corresponding to the actual reaction period of the catalyzer can only be integrated in the electrolytic integrating element 24.

Figure 7:
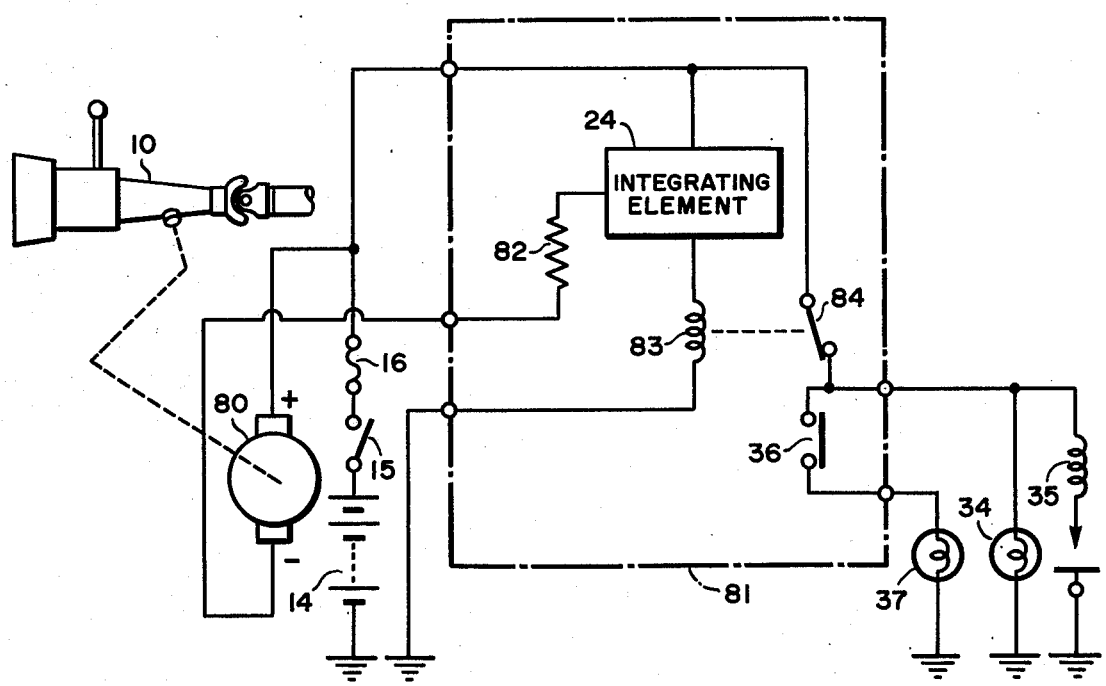
FIG. 7 is a circuit diagram showing a third embodiment of the present invention.

FIG. 7 shows a third embodiment of the present invention in which a d.c. generator is employed to convert the speed of a vehicle into an electrical signal. Referring to FIG. 7, the revolution of an output shaft 10 of a transmission of a vehicle is transmitted to the rotor of a d.c. generator 80, and the generator 80 generates a d.c. voltage proportional to the rotating speed of the output shaft 10 of the transmission. The output voltage of the generator 80 is applied via a resistor 82 to an electrolytic integrating element 24 forming a part of a traveled distance integrator 81. This electrolytic integrating element 24 is the same as that described with reference to FIG. 3. It can be easily understood from the previous description and from the Faraday's law that the operating timing of the electrolytic integrating element 24 is determined by the total quantity of electric charge passing across the anode and cathode thereof, and this means also the fact that the operating timing of the electrolytic integrating element 24 is determined by the integral with respect to time of the output current of the generator 80 which is proportional to the distance traveled by the vehicle.

It will be understood from the above description that the operation of this third embodiment shown in FIG. 7 is similar to that of the first embodiment and is such that, when a predetermined setting of the total traveled distance is reached, the electrolytic integrating element 24 operates to energize a display lamp 34 and a buzzer unit 35 in co-operation with an output relay coil 83 and an output relay contact 84. The mechano-electrical transducer employed in the third embodiment may be an a.c. generator in lieu of the d.c. generator 80 illustrated in FIG. 7.

Figure 8:
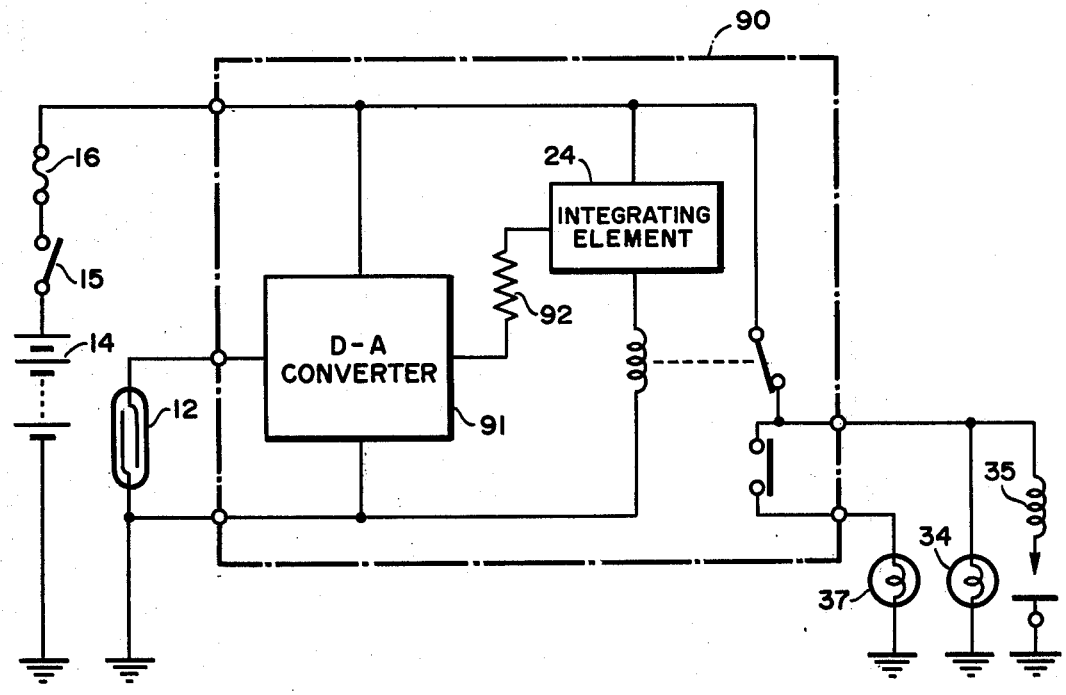
FIG. 8 is a circuit diagram showing a fourth embodiment of the present invention.

FIG. 8 shows a fourth embodiment of the present invention. In this fourth embodiment, a reed switch 12 converts the rotating speed of an output shaft of a transmission of a vehicle into an electrical signal, and therefore, the output of the reed switch 12 is a digital signal of pulse waveform similar to that in the first embodiment. However, in this fourth embodiment, the reed switch 12 is connected to a D-A converter 91 forming a part of a traveled distance integrator 90. Thus, the digital signal output of the reed switch 12 is converted into an analog signal by the D-A converter 91, and this analog signal output of the D-A converter 91 is applied via a resistor 92 to an electrolytic integrating element 24 as in the third embodiment. This electrolytic integrating element 24 is the same as that described with reference to FIG. 3.

It will be understood from the foregoing detailed description of the present invention that the traveled distance pertinent to inspection and reconditioning required for a vehicle can be exclusively integrated in an electrolytic integrating element to give an audible alarm and a visual display when a predetermined distance setting is reached so that the driver can be informed of the exact time at which such inspection and reconditioning must be made. Further, a plurality of such electrolytic integrating elements may be used to meet the requirement in which various sections of a vehicle must be inspected and reconditioned at different settings of the traveled distance, so that the vehicle sections requiring inspection and reconditioning can be appropriately and individually pointed out.

Figure 9:
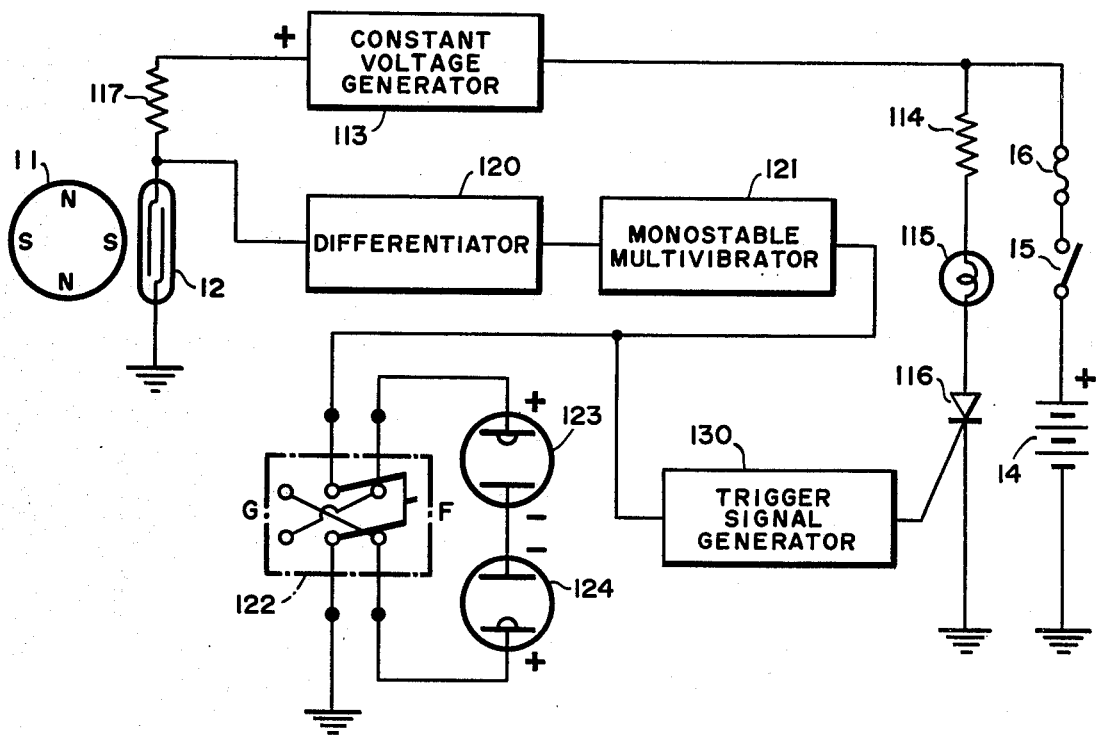
FIG. 9 is a block diagram showing a fifth embodiment of the present invention.

FIG. 9 is a block diagram of a fifth embodiment of the present invention. Referring to FIG. 9, a battery 14 in a vehicle supplies a power supply voltage to a constant voltage generator 113 and to an alarm displaying means via an ignition key switch 15 and a fuse 16. The alarm displaying means comprises a series circuit of a load resistor 114, a display lamp 115 and a thyristor 116, so that the display lamp 115 can be energized only when a trigger input is applied to the gate of the thyristor 116. The constant voltage generator 113 is provided for applying a stable constant voltage to the detected signal processing circuit. A reed switch 12 is connected to the constant voltage generator 113 via a resistor 117, and a speedometer driving magnet 11 is disposed in close proximity to the reed switch 12. Although not shown in detail, the magnet 11 is directly connected to an output shaft of a transmission of the vehicle and is magnetized to provide at least one pair of magnetic poles at the outer peripheral portion thereof as is commonly known in the art. Thus, with the rotation of the magnet 11 connected directly to the transmission output shaft, the reed switch 12 is repeatedly turned on and off so that a rectangular waveform having a frequency proportional to the speed of the vehicle appears across the reed switch 12. Since the pulse width of the signal detected in this manner varies depending on variations of the vehicle speed, such signal is converted into a rectangular waveform having a constant pulse width by a differentiator 120 and a mono-stable multivibrator 121. The output waveform of the mono-stable multivibrator 121 has a constant pulse width determined by the characteristics of the differentiator 120 and monostble multivibrator 121, and the frequency of this output waveform corresponds to the speed of the vehicle. Therefore, an electrical quantity corresponding to the distance traveled by the vehicle can be obtained by integrating the output pulses appearing from the monostable multivibrator 121.

Figure 10:
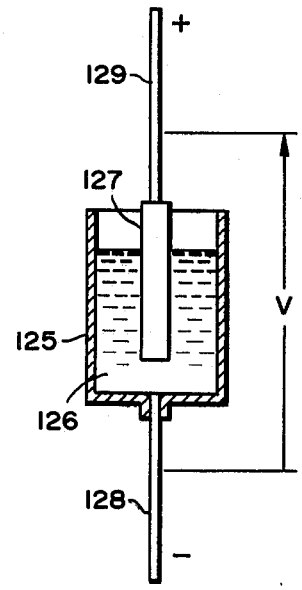
FIG. 10 is a sectional view showing the structure of an electrolytic integrating element in the fifth embodiment shown in FIG. 9.

The pulse signal output of the monostable multivibrator 121 is applied via a change-over switch 122 to a pair of electrolytic integrating elements 123 and 124 of the same construction. One of these electrolytic integrating elements 123 and 124 will be described with reference to FIG. 10 which is a sectional view of the element. Referring to FIG. 10, the electrolytic integrating element comprises an outer casing or electrode 125 of metal such as silver within which an electrolyte such as a silver phosphate solution 126 is contained. A central electrode 127 of metal such as gold is immersed in the silver phosphate solution 126, and a lead 128 forming a negative terminal extends from the outer electrode 125, while another lead 129 forming a positive terminal extends from the central electrode 127. It is apparent from the above-mentioned construction of the electrolytic integrating element used in the present invention that, when a suitable voltage is applied across the element, electrolysis corresponding to the applied voltage occurs in the element. When now a positive voltage and a negative voltage are applied to the positive and negative terminals respectively of the electrolytic integrating element shown in FIG. 10, the silver forming the outer electrode 125 is ionized to be deposited on the central electrode 127. This state is referred to as a charging operation. Then, when the direction of voltage application is reversed and the positive and negative voltages are applied to the negative and positive terminals respectively of the electrolytic integrating element, the silver deposited on the central electrode 127 is ionized agains to be deposited on the outer electrode 125 by the charging operation. This state is referred to as a discharging operation. The discharging operation continues until finally it ceases due to the ionization of all the silver deposited on the central electrode 127. The impedance of the electrolytic integrating element in the state of complete cessation of the discharging operation is extremely large compared with that in the discharging state so that attainment of a predetermined setting of the integrated electrical quantity can be detected by detecting this impedance.

Referring to FIG. 9 again, the change-over switch 122 is shown connected in a direction F, and the detected pulse signal output of the monostable multivibrator 121 is applied first to the electrolytic integrating element 123 and then to the electrolytic integrating element 124. These electrolytic integrating elements 123 and 124 are connected in series in polarities opposite to each other as shown. Further, the initial state of these electrolytic integrating elements 123 and 124 is such that no silver is deposited on the central electrode 127 of the electrolytic integrating element 123, while a predetermined quantity of silver is deposited on the central electrode 127 of the electrolytic integrating element 124. Thus, in response to the application of the detected pulse signal from the monostable multivibrator 121, the charging operation and discharging operation take place in the respective electrolytic integrating elements 123 and 124. The charging and discharging operations cease when the predetermined quantity of silver deposited on the central electrode 127 of the electrolytic integrating element 124 has been completely ionized due to the discharging operation.

Figure 11:
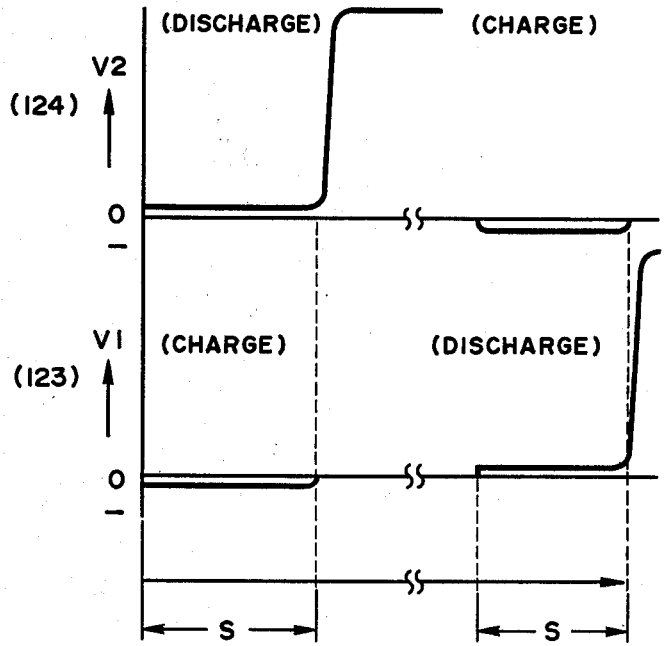
FIG. 11 shows the operating characteristic of the electrolytic integrating element shown in FIG. 10.

FIG. 11 shows the operating characteristic of these electrolytic integrating elements 123 and 124. In FIG. 11, the horizontal axis represents a parameter corresponding to, for example, the distance traveled by the vehicle or the operated period of time of the engine, and the vertical axis represents the voltage across the electrodes of the electrolytic intergating elements. The setting S shown in FIG. 11 represents the distance traveled by the vehicle until inspection and reconditioning is required, and this setting S corresponds also to the predetermined quantity of silver deposited previously on the central electrode 127 of the electrolytic integrating element 124. Until the traveled distance attains the setting S, the charging and discharging operations proceed continuously, and the interelectrode impedance during such a period of time is small. Thus, in such a range, the voltages V1 and V2 across the electrodes of the respective electrolytic integrating elements 123 and 124 are also low. However, when the traveled distance attains the setting S, the discharging operation in the electrolytic integrating element 124 ceases and the voltage V2 makes an abrupt increase, while at the same time, the charging operation in the electrolytic integrating element 123 ceases too. This abrupt change in the voltage is detected by a trigger signal generator 130 shown in FIG. 9, and a trigger signal is applied from the trigger signal generator 130 to the thyristor 116 to turn on the thyristor 116. The display lamp 115 is energized to inform the driver of the fact that the vehicle has already traveled the predetermined total distance and the time is reached requiring inspection and reconditioning of the vehicle.

After completion of the inspection and reconditioning of the vehicle, the change-over switch 122 is changed over to be connected in a direction G in FIG. 9. Consequently, the discharging operation takes place now in the electrolytic integrating element 123, while the charging operation takes place in the electrolytic integrating element 124. It can be understood, therefore, that the quantity of silver, which has been deposited on the central electrode 127 of the electrolytic integrating element 123 due to the integrating action and which is equal to the quantity initially set in the electrolytic integrating element 124, establishes the next setting of silver subject to electrolysis. In this manner, the change-over switch 122 is merely actuated to reverse the direction of the electrical connection between the electrolytic integrating elements 123 and 124 each time the setting of the traveled distance is reached, so that these electrolytic integrating elements 123 and 124 can substantially semipermanently continue their time limit indicating operation.

It will be understood from the foregoing detailed description of the fifth embodiment of the present invention that the indicator for detecting and displaying the time limit at which inspection and reconditioning of a vehicle must be carried out, comprises a pair of electrolytic integrating elements connected in series in polarities opposite to each other so that a discharging operation can take place in one of the elements while a charging operation proceeds in the other element and these elements can be repeatedly utilized for detection by a very simple resetting procedure. The indicator is thus advantageous in that it can efficiently operate and the maintenance cost thereof is quite low. In the indicator according to the present invention, the time limit indicating characteristic of these electrolytic integrating elements is determined by suitably selecting and setting the quantity of metal deposited previously on the center electrode thereof. The indicator is therefore advantageous in that the exact time requiring the inspection and reconditioning of the vehicle can be reliably detected and displayed since this setting is unchangeable inasmuch as these two electrolytic integrating elements operate simultaneously.

We claim:

1. An indicator for detecting and displaying the arrival of the time limit at which inspection and reconditioning of a vehicle must be carried out, comprising transducing means having a magnet rotatively driven by an output shaft of a transmission and a reed switch disposed in close proximity to the magnet, the reed switch being alternately closed and opened with the rotation of said magnet to transduce the number of rotations of the transmission output shaft into a distance signal, traveled distance integrating means including an electrolytic integrating element for integrating the electrical output signal of said transducing means by an electrochemical integrating operation and generating an alarm signal when the integrated amount of said applied input attains a predetermined value, and display means for performing an alarm displaying operation in response to the application of the alarm signal from said electrolytic integrating element.

2. An indicator as claimed in claim 1, wherein said electrolytic integrating element comprises a casing of metal containing an electrolyte therein and serving as one of a pair of electrodes, a metal electrode immersed in said electrolyte to serve as the other electrode, and a pair of leads extending from said metal electrode to serve as terminals across which the alarm signal appears, said electrical output signal of said transducing means being applied across said electrodes.

3. An indicator for detecting and displaying the arrival of the time limit at which inspection and reconditioning of a vehicle must be carried out, comprising transducing means having a magnet rotatively driven by an output shaft of a transmission and a reed switch disposed in close proximity to the magnet, the reed switch being alternately turned on and off with the rotation of the magnet to transduce the number of rotations of the transmission output shaft into a traveled distance signal, traveled distance integrating means including an electrolytic integrating element for integrating the electrochemical integrating operation and cutting off a display restraining circuit when the integrated amount of said applied input attains a predetermined value, and display means for performing an alarm displaying operation in response to the circuit cut-off operation of said electrolytic integrating element.

4. An indicator as claimed in claim 3, wherein said traveled distance integrating means comprises a differentiator for differentiating the output signal of said transducing means, a transistor circuit including a transistor turned on and off in response to the application of the output of said differentiator for generating output pulses which have a constant pulse width and whose frequency varies depending on the rotating speed of the transmission output shaft, an electrolytic integrating element subjected progressively to electrolytic corrosion in response to the application of the successive output pulses from said transistor circuit, and a display restraining circuit adapted to be cut off by said electrolytic integrating element when the total of the pulses applied to said electrolytic integrating element attains a predetermined value.

5. An indicator as claimed in claim 3, wherein the output signal of said transducing means is applied to said electrolytic integrating element after being shaped by a monostable multivibrator into a pulse signal having a constant pulse width.

6. An indicator as claimed in claim 4, wherein said display restraining circuit comprises an output relay contact for controlling the current supplied to said display means, and an output relay energizing coil for turning on and off said output relay contact, and an electrode of said electrolytic integrating element subjected to the electrolytic corrosion is connected in series with said output relay energizing coil.

7. An indicator as claimed in claim 4, wherein said display restraining circuit comprises an output relay contact for controlling the current supplied to said display means, and an output relay energizing coil for turning on and off said output relay contact, and an electrode of said electrolytic integrating element subjected to the electrolytic corrosion is connected to said output relay energizing coil via a driving transistor circuit.

8. An indicator as claimed in claim 6, wherein a display lamp is connected to said output relay contact.

9. An indicator as claimed in claim 6, wherein a buzzer unit is connected to said output relay contact.

10. An indicator as claimed in claim 2, wherein said electrolytic integrating element is replaceably mounted on a supporting base having a group of terminals connectable to a transistor circuit and to a display restraining circuit.

11. An indicator as claimed in claim 10, wherein a spare electrolytic integrating element can be additionally mounted on said supporting base.

12. An indicator as claimed in claim 11, further comprising a display lamp to indicate that the spare electrolytic integrating element is not present, and the supporting base includes contact terminals to energize the display lamp.

13. An indicator for detecting and displaying the arrival of the time limit at which inspection and reconditioning of a vehicle must be carried out, comprising transducing means having a magnet rotatively driven by an output shaft of a transmission and a reed switch disposed in close proximity to the magnet, the reed switch being alternately turned on and off with the rotation of the magnet to transduce the number of rotations of the transmission output shaft into a traveled distance signal, traveled distance integrating means including a transistor circuit for converting the electrical output signal of said transducing means into output pulses having a constant pulse width, an electrolytic integrating element subject progressively to electrolytic corrosion in response to the application of the successive output pulses from said transistor circuit, and a display restraining circuit adapted to be cut off by said electrolytic integrating element when the total of the pulses applied to said electrolytic integrating element attains a predetermined value, display means for performing an alarm displaying operation in response to the circuit cut-off operation of said electrolytic integrating element, a gate circuit for controlling the application of the pulses to said electrolytic integrating element, an exhaust gas purifier including a catalytic converter, and an exhaust gas control computer, said exhaust gas computer disabling said gate circuit and said exhaust gas purifier whenever and so long as either the speed of the vehicle or the internal temperature of said catalytic converter exceeds a predetermined value.

14. An indicator as claimed in claim 13, wherein said gate circuit comprises a diode connected to the base of a transistor in said transistor circuit which applies the output pulses to said electrolytic integrating element.

15. An indicator as claimed in claim 1, wherein said traveled distance integrating means comprises a trigger signal generator for generating a trigger signal by detecting variations in the voltage across the terminals of said electrolytic integrating element, and a thyristor turned on in response to the application of the trigger signal to the gate thereof.

16. An indicator for detecting and displaying the arrival of the time limit at which inspection and reconditioning of a vehicle must be carried out, comprising transducing means having a magnet rotatively driven by an output shaft of a transmission and a reed switch disposed in close proximity to the magnet, the reed switch being alternately turned on and off with the rotation of the magnet to transduce the number of rotations of the transmission output shaft into a traveled distance signal, traveled distance integrating means including a pair of electrolytic integrating elements connected in series in polarities opposite to each other for integrating the electrical output signal of said transducing means by an electrochemical integrating operation and generating an alarm signal when the integrated amount of said applied input attains a predetermined value, display means for performing an alarm displaying operation in response to the application of the alarm signal from said electrolytic integrating elements, and a change-over switch for changing over the direction of application of the electrical output signal from said transducing means to said electrolytic integrating elements.

* * * * *